(12) United States Patent
Ohira et al.

(10) Patent No.: US 9,005,810 B2
(45) Date of Patent: Apr. 14, 2015

(54) CATHODE ACTIVE MATERIAL, CATHODE AND NON-AQUEOUS SECONDARY BATTERY

(75) Inventors: Koji Ohira, Osaka (JP); Motoaki Nishijima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/807,967

(22) PCT Filed: Jun. 27, 2011

(86) PCT No.: PCT/JP2011/064694
§ 371 (c)(1),
(2), (4) Date: Feb. 15, 2013

(87) PCT Pub. No.: WO2012/002327
PCT Pub. Date: Jan. 5, 2012

(65) Prior Publication Data
US 2013/0209886 A1      Aug. 15, 2013

(30) Foreign Application Priority Data

Jul. 1, 2010   (JP) ................................. 2010-151056

(51) Int. Cl.
*H01M 4/134* (2010.01)
*H01M 4/505* (2010.01)
*C01B 25/45* (2006.01)
*H01M 4/58* (2010.01)
*C01B 25/37* (2006.01)

(52) U.S. Cl.
CPC ............... *H01M 4/505* (2013.01); *C01B 25/45* (2013.01); *H01M 4/5825* (2013.01); *C01B 25/37* (2013.01)

(58) Field of Classification Search
USPC ........................... 429/213, 221, 218.1, 231.95
See application file for complete search history.

(56) References Cited

U.S. PATENT DOCUMENTS

| | | | |
|---|---|---|---|
| 6,528,033 B1 | 3/2003 | Barker et al. | |
| 2001/0055718 A1 | 12/2001 | Li et al. | |
| 2002/0195591 A1 | 12/2002 | Ravet et al. | |
| 2003/0170542 A1* | 9/2003 | Barker et al. | 429/231.9 |
| 2003/0190527 A1 | 10/2003 | Pugh et al. | |
| 2003/0215715 A1 | 11/2003 | Barker et al. | |
| 2004/0086445 A1* | 5/2004 | Armand et al. | 423/306 |
| 2004/0214084 A1 | 10/2004 | Barker et al. | |
| 2005/0058905 A1 | 3/2005 | Barker et al. | |
| 2005/0181283 A1 | 8/2005 | Pugh et al. | |
| 2006/0014079 A1 | 1/2006 | Chang et al. | |
| 2006/0246351 A1 | 11/2006 | Barker et al. | |
| 2006/0292444 A1 | 12/2006 | Chiang et al. | |
| 2008/0261113 A1* | 10/2008 | Huang et al. | 429/221 |
| 2010/0124703 A1* | 5/2010 | Ohira et al. | 429/221 |
| 2010/0140540 A1* | 6/2010 | Yamada et al. | 252/182.1 |
| 2012/0070708 A1* | 3/2012 | Ohira et al. | 429/94 |

FOREIGN PATENT DOCUMENTS

| | | |
|---|---|---|
| CA | 2 271 354 A1 | 11/2000 |
| CN | 1837033 A | 9/2006 |
| CN | 101339994 A | 1/2009 |
| DE | 600 13 909 T2 | 9/2005 |
| DE | 600 37 609 T2 | 1/2009 |
| JP | 2001-307726 | 11/2001 |
| JP | 2001-307731 | 11/2001 |
| JP | 2002-198050 | 7/2002 |
| JP | 2004-178835 | 6/2004 |
| JP | 2005-519451 | 6/2005 |
| JP | 2005-522009 | 7/2005 |
| JP | 2009170401 * | 7/2007 |
| JP | 2008-506243 | 2/2008 |
| JP | 2009-104794 | 5/2009 |
| JP | 2009-170401 | 7/2009 |
| JP | 2011-77030 | 4/2011 |
| WO | WO 97/40541 | 10/1997 |
| WO | 2008/039170 A1 | 4/2008 |
| WO | WO 2010/134579 | 11/2010 |
| WO | WO 2010134579 * | 11/2010 |

OTHER PUBLICATIONS

International Search Report for PCT/JP2011/064694, mailed Sep. 20, 2011.
Office Action mailed Mar. 24, 2014 in U.S. Appl. No. 13/321,717.
Recham et al, "Formation of a Complete Solid Solution Between the Triphylite and Fayalite Olivine Structures", Chem. Matter, 2008, 20, pp. 6798-6809.
International Search Report for PCT/JP2010/058559 mailed Aug. 10, 2010.
Yanwen et al, "Research on Cathode Material of Li-ion Battery by Yttrium Doping", Science Direct, Journal of Rare Earths, vol. 26, No. 2, Apr. 2008, pp. 279-283.
Wang et al, "A Study on LiFePO$_4$ and its Doped Derivatives as Cathode Materials for Lithium-Ion Batteries", Science Direct, Journal of Power Sources 159 (2006), pp. 282-286.
Padhi et al., Phospho-olivines as Positive-Electrode Materials for Rechargeable Lithium Batteries, J. Electrochem. Soc. 144(4), (Apr. 1997).
Office Action mailed Aug. 8, 2014 in U.S. Appl. No. 13/321,717.

* cited by examiner

*Primary Examiner* — Stewart Fraser
*Assistant Examiner* — Olatunji Godo
(74) *Attorney, Agent, or Firm* — Nixon & Vanderhye P.C.

(57) ABSTRACT

A cathode active material having a composition represented by the following formula (1)

$$LiMn_{1-x}M_xP_{1-y}Si_yO_4 \qquad (1)$$

wherein M is at least one kind of element selected from the group consisting of Zr, Sn, Y and Al; x is within a range of $0<x\le0.5$; and y is within a range of $0<y\le0.5$.

6 Claims, No Drawings

CATHODE ACTIVE MATERIAL, CATHODE AND NON-AQUEOUS SECONDARY BATTERY

This application is the national phase of International Application No. PCT/JP2011/064694, filed Jun. 27, 2011, which claims priority to Japanese Patent Application No. 2010-151056 filed Jul. 1, 2010. The disclosures of the prior applications are incorporated herein in their entirety by reference.

TECHNICAL FIELD

The present invention relates to a cathode (positive) active material, a cathode (positive electrode) and a non-aqueous secondary battery. More particularly, the present invention relates to a cathode active material that gives a non-aqueous secondary battery excellent in cycle characteristics, to a cathode using this cathode active material and to a non-aqueous secondary battery using this cathode.

BACKGROUND ART

As a secondary battery for a portable electronic apparatus, a non-aqueous secondary battery (particularly, a lithium secondary battery; hereinafter, it will be also referred to just the battery) has been put into practical use and has been widely prevalent. Further, in recent years, a lithium secondary battery is attracting people's attention not only as a small-sized one for a portable electronic apparatus but also as a large-capacity device for being mounted on a vehicle or for electric power storage. For this reason, there has been an increasing demand for safety, cost performance, lifetime and the like.

Generally, a layered transition metal oxide represented by $LiCoO_2$ is used as an active material for cathode constituting a non-aqueous secondary battery. However, the layered transition metal oxide is liable to provoke oxygen elimination in a fully charged state at a comparatively low temperature around 150° C. Since this oxygen elimination reaction generates heat, oxygen is further eliminated. Therefore, a thermal bursting reaction where oxygen is continuously eliminated can be provoked. Therefore, in the non-aqueous secondary battery having the cathode active material, an accident such as heat generation or fire catching may happen.

Particularly for a non-aqueous secondary battery in a large size and a large capacity for being mounted on a vehicle or for electric power storage, high safety is demanded. Therefore, it has been expected to use lithium manganate ($LiMn_2O_4$) having a spinel structure, lithium iron phosphate ($LiFePO_4$) having an olivine structure and the like that are stable in structure and do not release oxygen at an abnormal occasion as a cathode active material.

Further, as a result of prevalence of a non-aqueous secondary battery for being mounted on a vehicle, a big increase in the using amount of the cathode active material is presumed. Therefore, exhaustion of resources corresponding to the elements constituting the cathode active material is becoming a problem. It is particularly demanded to reduce the use of cobalt (Co) having a low degree of presence in the earth crust as a resource. For this reason, it has been expected to use lithium nickelate ($LiNiO_2$) or a solid solution thereof (Li($Co_{1-x}Ni_x$)$O_2$), lithium manganate ($LiMn_2O_4$), lithium iron phosphate ($LiFePO_4$) or the like as a cathode active material.

In view of enhancing the safety and of preventing the exhaustion of resources, $LiFePO_4$ has been widely investigated. As a result of the investigations, $LiFePO_4$ has been practically used as a cathode active material due to improvements in fine pulverization of particles comprising $LiFePO_4$, in substitution of Fe and P with other elements, in coating of carbon on the particle surfaces, etc.

Here, there is a problem for $LiFePO_4$ that its average electric potential is as low as 3.4 volts as compared with other cathode active materials. In view of the average electric potential, a cathode active substance having a high-potential olivine type structure such as $LiMnPO_4$ has been also studied. However it has been known that intercalation and deintercalation of Li is difficult in $LiMnPO_4$ since its conductivity is lower than that of $LiFePO_4$ (refer to the Patent Document 1).

For this reason, there is a proposal for substituting a part of Mn with other element for the purpose of increasing the charge/discharge capacity by improving the charge/discharge characteristics (refer, for example, to the Patent Document 2). There is also a proposal for an active material represented by the formula $A_aM_b(XY_4)_cZ_d$ (in the formula, A is an alkali metal; M is a transition metal; $XY_4$ is $PO_4$ or the like; and Z is OH or the like) (refer, for example, to the Patent Document 3).

Further, there is another proposal for an active material represented by the formula $LiMP_{1-x}A_xO_4$ (in the formula, M is a transition metal; A is an element where an oxidation number is +4 or less; and 0<x<1) where the P site is substituted with an element A (refer, for example, to the Patent Document 4). There is still another proposal for an active material represented by the formula $A_{a+x}M_bP_{1-x}Si_xO_4$ (in which A is Li, Na or K; and M is a metal) where the P site is substituted with Si (refer, for example, to the Patent Document 5).

PRIOR ART DOCUMENTS

Patent Documents

Patent Document 1: Japanese Unexamined Patent Publication 2000-509193A
Patent Document 2: Japanese Unexamined Patent Publication 2001-307731A
Patent Document 3: Japanese Unexamined Patent Publication 2005-522009A
Patent Document 4: Japanese Unexamined Patent Publication 2008-506243A
Patent Document 5: Japanese Unexamined Patent Publication 2005-519451A

SUMMARY OF THE INVENTION

Problems that the Invention is to Solve

Volume change ratio of $LiFePO_4$ as a result of charging and discharging is about 7% while that of $LiMnPO_4$ is as high as about 9%. Therefore, since expansion or contraction caused by intercalation and deintercalation of Li as a result of charging and discharging is big in $LiMnPO_4$, it is gradually dropped off physically from a current collector or an electro-conductive material constituting the cathode when charging and discharging are repeatedly carried out. The present inventors guessed that, as a result thereof, the lifetime of the battery becomes short due to a decrease in the capacity as a result of an increase in $LiMnPO_4$ which does not participate in charging and discharging.

The present inventors have now extensively conducted investigations for a cathode active material where the volume change ratio as a result of intercalation and deintercalation of Li is small and the lifetime is long whereupon they have found the present invention.

Means for Solving the Problems

Thus, in accordance with the present invention, there is provided a cathode active material having a composition represented by the following formula (1)

$$\text{LiMn}_{1-x}\text{M}_x\text{P}_{1-y}\text{Si}_y\text{O}_4 \quad (1)$$

wherein M is at least one kind of element selected from the group consisting of Zr, Sn, Y and Al; x is within a range of $0<x\le0.5$; and y is within a range of $0<y\le0.5$.

Advantages of the Invention

In the cathode active material according to the present invention, its volume change as a result of charging and discharging can be suppressed whereby its lifetime is long. In addition, an electric potential for charging and discharging correspondent to the change in the valence of Mn can be obtained whereby it is now possible to achieve higher average electric potential than that of LiFePO$_4$. Further, since the substituted element in the Mn site is an element having a single valence number, the electric potential upon charging and discharging becomes flat and it is now possible to output the constant electric potential regardless of the capacity of the battery.

Still further, when the cathode active material has a volume change ratio of not more than 8% as a result of intercalation and deintercalation of Li, volume change is much more suppressed whereby they is provided a cathode active material having longer lifetime.

Furthermore, when M is any one kind of element selected from the group consisting of Zr, Y and Al and x is within a range of $0.05 \le x \le 0.25$, volume change is much more suppressed whereby there is provided a cathode active material of longer lifetime.

MODE FOR CARRYING OUT THE INVENTION

In the present invention, LiMnPO$_4$ having an olivine structure is adopted as a fundamental structure and Mn and P are partially substituted with other element whereby volume change due to intercalation and deintercalation of Li is suppressed and long lifetime of the battery is realized.

To be more specific, the present invention has been achieved as a result of finding of the present inventors that volume change due to intercalation and deintercalation of Li is suppressed in such a cathode active material where the P site is substituted with Si and, at the same time, the Mn site is substituted with a tri- or tetravalent element together with conducting the electric potential compensation.

The present invention will now be described in more detail as hereunder. Incidentally, "A to B" representing a range in the present specification means being larger than or equal to A and smaller than or equal to B. Further, various physical properties mentioned in the present specification stand for the values measured by the methods described in Examples mentioned later unless specifically stated otherwise.

(1) Cathode Active Material

The cathode active material concerning the present embodiment has a composition represented by the following formula (1).

$$\text{LiMn}_{1-x}\text{M}_x\text{P}_{1-y}\text{Si}_y\text{O}_4 \quad (1)$$

(In the formula, M is at least one kind of element selected from the group consisting of Zr, Sn, Y and Al; x is within a range of $0<x\le0.5$; and y is within a range of $0<y\le0.5$.)

Here, it is preferred that x, y and M have such a relation that $x \times [(\text{valence of M})-2]-0.05 < y < x \times [(\text{valence of M})-2]+0.05$.

Generally, in the case of LiMnPO$_4$ of an olivine type, volume of its crystal structure in the initial stage contracts upon deintercalation of Li by charging. The contraction of volume is resulted by contraction of a-axis and b-axis and by expansion of c-axis of the crystal structure in the initial stage. For this reason, the present inventors have predicted that the volume contraction can be suppressed when the contraction ratio of the a- and b-axes is decreased and the expansion ratio of the c-axis is expanded by means of some substitutions in the constituting elements of LiMnPO$_4$.

As a result of specific investigations therefor, the present inventors have now found that, when a part of P site is substituted with Si and a part of Mn site is substituted with other element together with conducting the electric charge compensation in the crystal structure, the volume change which occurs upon deintercalation of Li can be suppressed and, as a result, the capacity decrease by repeated charging and discharging can be suppressed.

Incidentally, most of cathode active materials having the composition of the above formula (1) have an olivine type structure. However, the scope of the present invention also covers a cathode active material having the composition of the above formula (1) but not having olivine type structure.

In the cathode active material of the present invention, the P site is substituted with Si. The reference y showing the substituting ratio of the P site with Si is within a range of $0<y\le0.5$ and can be 0.1, 0.2, 0.3 or 0.4.

Since valence numbers of P and Si are different hereinabove, it is preferred to conduct the electric charge compensation in the crystal structure. For this reason, the Mn site is substituted with M. The electric charge compensation means to decrease the sum of the increased electric charges in the crystal structure by substitution of the P site with Si. It is particularly preferred that the sum of the increased electric charges in the crystal structure becomes as close as possible to zero by the electric charge compensation.

Here, in the above formula (1), valence number of P is +5 and that of Si is +4. When, for example, sum of the electric charges in the crystal structure is made zero, y which is the substituting amount of Si satisfies the formula of $y=x\times[(\text{valence number of M})-2]$.

Mn may also contain a small amount of Mn where the valence is +3. In that case, the electric charge compensation can be conducted when y (the substituting amount of Si) is within a range of $x\times[(\text{valence number of M})-2]-0.05<y<x\times[(\text{valence number of M})-2]+0.05$.

It is also preferred that the changing ratio of volume of unit lattice in the formula (1) to the volume of the unit lattice in Li$_A$Mn$_{1-x}$M$_x$P$_{1-y}$Si$_y$O$_4$ (in the formula, A is 0 to x) after deintercalation of Li is 8% or less. When the volume changing ratio is 8% or less, the capacity retaining ratio at 500 cycles can be made 80% or more. Lower limit of the changing ratio is 0%. The changing ratio can be 7%, 6%, 5%, 4%, 3%, 2% or 1%.

The element M substituting the Mn site is at least one kind of element selected from the group consisting of Zr, Sn, Y and Al. Accordingly, M may be any one of the four kinds of elements or may be a combination of two or more elements. The element M substituting the Mn site is preferred to be such an element where valence number is +3 or +4. It is more preferred to substitute the Mn site with an element of +4 valence number particularly because of a big suppressive effect for the volume changing ratio. M may also be a mixture of elements having plural valence numbers. In that case, the valence number in stipulating the above y is an average valence number.

As to the element M of +3 valence number which can substitute the Mn site, Y or Al which does not change the valence number during the synthesis is preferred. When the valence number does not change during the synthesis, a cathode active material can be synthesized in a stable manner.

As to the element M of +4 valence number which can substitute the Mn site, Zr or Sn which does not change the valence number during the synthesis is preferred. When the valence number does not change during the synthesis, a cathode active material can be synthesized in a stable manner.

The substituting amount x in the Mn site is within a range of more than 0 and not more than 0.5. When the range is within the above, the volume change occurring during intercalation and deintercalation of Li can be suppressed without a big decrease of discharging capacity upon making into a non-aqueous secondary battery. x can be 0.1, 0.2, 0.3 or 0.4.

It is possible that, the more the substituting amount in the Mn site, the more the suppression of the volume changing ratio. In other words, the more the substituting amount in the Mn site, the more the improvement in the capacity retaining ratio at 100 cycles. When the volume changing ratio is 8% or less, the capacity retaining ratio can be made 80% or more.

When the Mn site is substituted with an element M of +3 valence number, amount of Si becomes the same as the substituting amount in the Mn site so as to maintain the electric neutrality. In that case, the substituting amount x is preferably 0.05 or more and, more preferably, 0.1 or more.

When the Mn site is substituted with an element M of +4 valence number, amount of Si becomes two times the substituting amount in the Mn site so as to maintain the electric neutrality. In that case, the substituting amount x is preferably 0.05 or more and, more preferably, 0.1 or more.

On the contrary, the more the substituting amount in the Mn site, the less the initial capacity. When it is presumed that theoretical capacity is different depending upon the substituting amount and that only Mn changes its valence number, it is possible to determine the theoretical capacity by the substituting amount.

When Mn is substituted with Zr, the substituting amount x in the Mn site is preferred to be 0.35 or less in view of achieving the initial capacity of 100 mAh/g or more. Further, in view of achieving the initial capacity of 110 mAh/g or more, the substituting amount x in the Mn site is more preferred to be 0.3 or less. Furthermore, in view of achieving the initial capacity of 120 mAh/g or more, the substituting amount x in the Mn site is particularly preferred to be 0.25 or less.

When Mn is substituted with Sn, the substituting amount x in the Mn site is preferred to be 0.3 or less in view of achieving the initial capacity of 100 mAh/g or more. Further, in view of achieving the initial capacity of 110 mAh/g or more, the substituting amount x in the Mn site is more preferred to be 0.25 or less. Furthermore, in view of achieving the initial capacity of 120 mAh/g or more, the substituting amount x in the Mn site is particularly preferred to be 0.2 or less.

When Mn is substituted with Y, the substituting amount x in the Mn site is preferred to be 0.35 or less in view of achieving the initial capacity of 100 mAh/g or more. Further, in view of achieving the initial capacity of 110 mAh/g or more, the substituting amount x in the Mn site is more preferred to be 0.3 or less. Furthermore, in view of achieving the initial capacity of 120 mAh/g or more, the substituting amount x in the Mn site is particularly preferred to be 0.25 or less.

When Mn is substituted with Al, the substituting amount x in the Mn site is preferred to be 0.45 or less in view of achieving the initial capacity of 100 mAh/g or more. Further, in view of achieving the initial capacity of 110 mAh/g or more, the substituting amount x in the Mn site is more preferred to be 0.4 or less. Furthermore, in view of achieving the initial capacity of 120 mAh/g or more, the substituting amount x in the Mn site is particularly preferred to be 0.3 or less.

The cathode active material can be produced by a solid phase method, a sol-gel method, a melting-quenching method, a mechanochemical method, a co-sedimentation method, a hydrothermal method, a spray pyrolysis method or the like. Examples of the starting substances include carbonate, hydroxide, chloride, sulfate, acetate, oxide, oxalate, nitrate, alkoxide and the like of each element. The starting substance may be a combination of any of the above. The starting substance may also contain water of crystallization.

It is also possible to enhance the electric conductivity by coating a carbon membrane on a cathode active material as being commonly done in lithium iron phosphate of an olivine type.

(II) Non-Aqueous Secondary Battery

A non-aqueous secondary battery has a cathode, an anode, an electrolyte and a separator. Each of such constituting materials will be explained hereunder.

(a) Cathode

A cathode contains the above cathode active material, an electrical conductive material and a binder.

Examples of a method for preparing a cathode include a method where a slurry in which a cathode active material, an electrical conductive material and a binder are mixed with an organic solvent is applied onto an electric collector and a method where a mixed powder comprising a binder, an electrical conductive material and a cathode active material is made into a sheet and the resulting sheet is press-bonded onto an electric collector.

As a cathode active material, it is also possible to use the above cathode active material by mixing with other cathode active material (such as $LiCoO_2$, $LiMn_2O_4$ or $LiFePO_4$).

As a binder, there may be used polytetrafluoroethylene, poly(vinylidene fluoride), poly(vinyl chloride), ethylene propylene diene polymer, styrene-butadiene rubber, acrylonitrile-butadiene rubber, fluorine rubber, poly(vinyl acetate), poly(methyl methacrylate), polyethylene, nitrocellulose, etc.

As the electrical conductive material, acetylene black, carbon, graphite, natural graphite, artificial graphite, needle coke and the like can be used.

As an electric collector, there may be used foamed (porous) metal having continuous pores, metal made into a honeycomb shape, sintered metal, expanded metal, metal in a nonwoven fabric form, metal sheet, metal foil, perforated metal sheet, metal net, etc. Examples of the metal include stainless steel and copper.

As an organic solvent, there may be used N-methylpyrrolidone, toluene, cyclohexane, dimethylformamide, dimethylacetamide, methyl ethyl ketone, methyl acetate, methyl acrylate, diethyltriamine, N,N-dimethylaminopropylamine, ethylene oxide, tetrahydrofuran, etc.

Thickness of the cathode is preferred to be about 0.01 to 20 mm. When it is too thick, electrical conductivity may lower while, when it is too thin, capacity per unit area may lower. A cathode prepared by means of applying and drying may be compressed using a roller press or the like for enhancing the packing density of the active material.

(b) Anode

An anode contains an anode active material, an electric conductive material and a binder.

An anode can be produced by a known method. To be more specific, it can be produced by the same method as mentioned in the method for producing a cathode.

As an anode active material, known one may be used. For constituting a battery of high energy density, it is preferred that the intercalation/deintercalation potential of lithium is near the deposition/dissolution potential of metal lithium. A typical example thereof is a carbon material such as natural or artificial graphite in particles (flakes, rods, fibers, whiskers, spheres, ground particle form, etc.).

Examples of the artificial graphite include a graphite which is prepared by graphitization of mesocarbon microbeads, mesophase pitch powder, isotropic pitch powder or the like. Graphite particles where amorphous carbon is adhered onto the surfaces can be used as well. Among them, natural graphite is more preferred because it is less expensive, has electric potential near the oxidation reduction electric potential of lithium and can constitute a battery of high energy density.

It is also possible to use lithium transition metal oxide, lithium transition metal nitride, transition metal oxide, silicon oxide or the like as an anode active material. Among them, $Li_4Ti_5O_{12}$ is more preferred because flatness of the electric potential is high and volume change by charging and discharging is small.

As to an electric conductive material and a binder, any of them exemplified for a cathode may be used.

(c) Electrolyte

As an electrolyte, there may be used, for example, an organic electrolytic solution, a gel-form electrolyte, a polymer solid electrolyte, an inorganic solid electrolyte and a molten salt.

Examples of an organic solvent constituting the above organic electrolytic solution include cyclic carbonates such as propylene carbonate (PC), ethylene carbonate (EC) or butylene carbonate; chain carbonates such as dimethyl carbonate (DMC), diethyl carbonate (DEC), ethyl methyl carbonate or dipropyl carbonate; lactones such as γ-butyrolactone (GBL) or γ-valerolactone; furans such as tetrahydrofuran or 2-methyltetrahydrofuran; ethers such as diethyl ether, 1,2-dimethoxyethane, 1,2-diethoxyethane, ethoxymethoxyethane or dioxane; dimethyl sulfoxide; sulfolane; methylsulfolane; acetonitrile; methyl formate; methyl acetate; etc. Each of those organic solvents may be used solely or two or more thereof may be mixed and used.

The cyclic carbonates such as PC, EC or butylene carbonate are high-boiling solvents. Therefore, when the cyclic carbonates are used, it is advantageous to mix with GBL.

Examples of an electrolyte salt constituting the organic electrolytic solution include lithium salts such as lithium borofluoride ($LiBF_4$), lithium hexafluorophosphate ($LiPF_6$), lithium trifluoromethanesulfonate ($LiCF_3SO_3$), lithium trifluoroacetate ($LiCF_3COO$) or lithium bis(trifluoromethanesulfone)imide ($LiN(CF_3SO_2)_2$). Only one of those electrolyte salts may be used or two or more thereof may be mixed and used. The salt concentration of the electrolytic solution is suitable to be 0.5 to 3 mol/liter.

(d) Separator

A separator is positioned between cathode and anode.

As the separator, examples thereof include porous material and nonwoven fabric. As a material for the separator, that which is neither dissolved nor swollen in the organic solvent contained in the electrolyte as mentioned above is preferred. Specific examples thereof include polyester polymers, polyolefin polymers (such as polyethylene or polypropylene), ether polymers and inorganic materials (such as glass).

(e) Others

Besides cathode, anode, electrolyte and separator, the non-aqueous secondary battery can also use other constituent elements which are usually used in a non-aqueous secondary battery. Examples of the other constituent elements as such include a battery container and a safety circuit.

(f) Method of Producing a Non-Aqueous Secondary Battery

A non-aqueous secondary battery can be produced, for example, by carrying out a step of laminating a cathode and an anode with a separator being interposed therebetween. The laminated product comprising cathode, anode and separator prepared as such may, for example, have a flat shape in stripes. Further, in the case of producing a battery in a tubular or flat shape, the laminated product may be rounded and wound.

One or more laminated product(s) may be inserted into the inside of a battery container. Usually, a cathode and an anode are connected to an external electroconductive terminal of the battery. After that, the battery container is usually tightly closed so as to shield the laminated product against the ambient air.

A method for the tight closing is as follows. Thus, in the case of a tubular battery, it is a common method where a lid having a packing made of resin is fit into an opening of a battery container followed by caulking the container. In the case of a square-shaped battery, there may be used a method where a metallic lid called a sealed opening plate is attached to an opening and welding is conducted to tightly close. Besides those methods, it is also possible to use a method where a binder is used to tightly close and a method where a bolt is fixed through the intermediary of a gasket to tightly close. It is further possible to use a method where a laminated membrane where thermoplastic resin is adhered to metal foil is used to tightly close. Incidentally, an opening part for injecting the electrolyte may be formed upon the tight closing. Further, it is also possible to turn on the electricity between cathode and anode before the tight closing so as to remove the generated gas.

The present invention is not limited to the above-mentioned description but various modifications are possible within the scope defined by the claims. Thus, the technical scope of the present invention also covers such an embodiment which is achieved by a combination with a technical means being appropriately modified within a scope of the claims.

EXAMPLES

The present invention will now be illustrated in more detail by way of Examples although it is not limited to the following Examples only. Reagents, etc. used in Examples are those of analytical grade manufactured by Kishida Chemical unless specified otherwise.

(I) Preparation of Cathode and Cathode Active Material

Example 1

Preparation of Cathode Active Material

As starting source materials, there were used $LiCH_3COO$ as a lithium source, $Mn(NO_3)_2 \cdot 6H_2O$ as a manganese source, $SnCl_2$ as a tin source, $H_3PO_4$ (85%) as a phosphorus source and $Si(OC_2H_5)_4$ as a silicon source. By setting the weight of $LiCH_3COO$ serving as the lithium source to be 1.3196 g, each of the above materials was weighed so that the molar ratio of Li:Mn:Sn:P:Si was made 1:0.9:0.1:0.8:0.2. After that, they were dissolved in 30 ml of $C_2H_5OH$ and stirred at room temperature using a stirrer for 48 hours. Then the solvent was evaporated in a thermostat of 40° C. to give a precursor of the cathode active material.

After adding 15% by weight of sucrose to the resulting precursor, the mixture was well mixed using an agate mortar. The resulting mixture was burned in a nitrogen atmosphere at 600° C. for 12 hours to synthesize a single phase powder (cathode active material) of $LiMn_{0.9}Sn_{0.1}P_{0.8}Si_{0.2}O_4$.

<Preparation of Cathode>

About 1 g of the resulting cathode active material was weighed and ground using an agate mortar. The ground one was mixed with about 10% by weight (to the cathode active material) of acetylene black (trade name: "Denka Black" manufactured by Denki Kagaku Kogyo) as an electric conductive material and about 10% by weight (to the cathode active material) of polyvinylidene fluoride resin powder as a binder.

This mixture was dissolved in N-methyl-2-pyrrolidone and the resulting slurry was applied onto both surfaces of an aluminum foil of 20 μm thickness by a doctor blade method. The applied amount was made about 5 mg/cm². The resulting coated film was dried and pressed to give a cathode.

Example 2

As starting source materials, there were used $LiOH.H_2O$ as a lithium source, $MnCO_3$ as a manganese source, $AlCl_3.6H_2O$ as an aluminum source, $(NH_4)_2HPO_4$ as a phosphorus source and $Si(OC_2H_5)_4$ as a silicon source. By setting the weight of $LiOH.H_2O$ serving as the lithium source to be 0.25 g, each of the above materials was weighed so that the molar ratio of Li:Mn:Al:P:Si was made 1:0.875:0.125:0.875:0.125. After that, they were mixed using a planet-type ball mill (Planet M2-3F manufactured by Gokin Planetaring) to give a mixture of starting source materials. The mixing was conducted using a zirconia pot and 70 g of zirconia balls of 10 mm diameter. The mixing condition was made 1 hour at 400 rpm.

After adding 10% by weight of sucrose to the resulting mixture of starting source materials, the mixture was well mixed using an agate mortar. The resulting mixture was burned in a nitrogen atmosphere at 650° C. for 12 hours to synthesize a single phase powder (cathode active material) of $LiMn_{0.875}Al_{0.125}P_{0.875}Si_{0.125}O_4$.

The resulting cathode active material was subjected to the same operation as in Example 1 to give a cathode.

Example 3

Preparation of Cathode Active Material

As starting source materials, there were used $LiOH.H_2O$ as a lithium source, $MnCO_3$ as a manganese source, $ZrOCl_3.8H_2O$ as a zirconium source, $(NH_4)_2HPO_4$ as a phosphorus source and $Si(OC_2H_5)_4$ as a silicon source. By setting the weight of $LiOH.H_2O$ serving as the lithium source to be 0.25 g, each of the above materials was weighed so that the molar ratio of Li:Mn:Zr:P:Si was made 1:0.95:0.05:0.9:0.1. After that, they were mixed using a planet-type ball mill (Planet M2-3F manufactured by Gokin Planetaring) to give a mixture of starting source materials. The mixing was conducted using a zirconia pot and 70 g of zirconia balls of 10 mm diameter. The mixing condition was made 1 hour at 400 rpm.

After adding 10% by weight of sucrose to the resulting mixture of starting source materials, the mixture was well mixed using an agate mortar. The resulting mixture was burned in a nitrogen atmosphere at 550° C. for 12 hours to synthesize a single phase powder (cathode active material) of $LiMn_{0.95}Zr_{0.05}P_{0.9}Si_{0.1}O_4$.

The resulting cathode active material was subjected to the same operation as in Example 1 to give a cathode.

Comparative Example 1

As starting source materials, there were used $LiCH_3COO$ as a lithium source, $Mn(NO_3)_2.6H_2O$ as a manganese source, $Fe(NO_3)_3.9H_2O$ as an iron source and $H_3PO_4$ (85%) as a phosphorus source. By setting the weight of $LiCH_3COO$ serving as the lithium source to be 1.3196 g, each of the above materials was weighed so that the molar ratio of Li:Mn:Fe:P was made 1:0.8:0.2:1. After that, they were dissolved in 30 ml of $C_2H_5OH$ and stirred at room temperature using a stirrer for 48 hours. Then the solvent was evaporated in a thermostat of 40° C. to give a precursor of the cathode active material.

After adding 15% by weight of sucrose to the resulting precursor, the mixture was well mixed using an agate mortar. The resulting mixture was burned in a nitrogen atmosphere at 600° C. for 12 hours to synthesize a single phase powder (cathode active material) of $LiMn_{0.8}Fe_{0.2}PO_4$.

The resulting cathode active material was subjected to the same operation as in Example 1 to give a cathode.

Comparative Example 2

As starting source materials, there were used $LiCH_3COO$ as a lithium source, $Mn(NO_3)_2.6H_2O$ as a manganese source, $SnCl_2$ as a tin source, $H_3PO_4$ (85%) as a phosphorus source and $Si(OC_2H_5)_4$ as a silicon source. By setting the weight of $LiCH_3COO$ serving as the lithium source to be 1.3196 g, each of the above materials was weighed so that the molar ratio of Li:Mn:Sn:P:Si was made 1:0.95:0.05:0.9:0.1. After that, they were dissolved in 30 ml of $C_2H_5OH$ and stirred at room temperature using a stirrer for 48 hours. Then the solvent was evaporated in a thermostat of 40° C. to give a precursor of the cathode active material.

After adding 15% by weight of sucrose to the resulting precursor, the mixture was well mixed using an agate mortar. The resulting mixture was burned in a nitrogen atmosphere at 600° C. for 12 hours to synthesize a single phase powder (cathode active material) of $LiMn_{0.95}Sn_{0.05}P_{0.9}Si_{0.1}O_4$.

The resulting cathode active material was subjected to the same operation as in Example 1 to give a cathode.

(II) Evaluation of Cathode Active Materials

<X-Ray Analysis>

The cathode active material prepared as such was ground using an agate mortar. The ground cathode active material was subjected to an X-ray analysis device (product name: MiniFlex II manufactured by Rigakusha) to give a powder X-ray diffractometric pattern and, from the resulting pattern, a lattice constant before charging was determined.

(III) Evaluation of Non-Aqueous Secondary Battery (III-I) Capacity Ratio $LiPF_6$ was dissolved in a solvent comprising 50% by volume of ethylene carbonate and 50% by volume of diethyl carbonate so as to make the concentration 1 mol/liter whereupon an electrolyte was prepared. The resulting electrolyte (about 30 ml) was poured into a 50-ml beaker. Each of the cathodes prepared in Examples and Comparative Examples and a counter electrode comprising metal lithium as an anode active material were dipped in the electrolyte to give a non-aqueous secondary battery.

The non-aqueous secondary battery prepared as such was subjected to an initial charging in an environment of 25° C. The charging current was set to be 0.1 mA and, when the potential of the battery reached 4.2 V, the charging was ended. Then discharging was conducted at 0.1 mA and the discharging was ended at the stage where the potential of the battery reached 2.0 V so as to determine an actual measured capacity of this battery.

The resulting actual measured capacities are shown in Table 1.

(III-II) Volume Change Ratio

The battery prepared in "(III-I) Capacity ratio" was further subjected to constant-current charging with the current of 1 mA until 4.2 V so that the state where the lithium in the cathode active material was deintercalated was resulted. After that, the taken-out cathode was subjected to a powder X-ray diffractometric measurement to determine the lattice constant after deintercalation of lithium (after charging).

The volume change ratio was determined from the lattice constant before charging and that after charging. The volume change ratios are shown in Table 1.

(III-III) Capacity Retaining Ratio

Measurement of capacity retaining ratio was conducted in the battery prepared in "(III-I) Capacity ratio". Charging current was made 0.1 mA and, when the potential of the battery reached 4.2 V, the charging was ended. After the charging was ended, discharging was conducted at 1 mA and, when the potential of the battery reached 2.0 V, discharging was ended so as to determine an initial discharging capacity of this battery. Further, charging and discharging were repeated using the current of 1 mA, the discharging capacity in the 100th run was measured and the capacity retaining ratio was determined by the following formula.

Capacity retaining ratio=(Discharging capacity in the 100th run)/(Initial discharge capacity)

Volume changing ratio, initial discharging capacity and capacity retaining ratio obtained in those measurements are shown in Table 1.

TABLE 1

| cathode active material | volume changing ratio (%) | initial discharging capacity (mAh/g) | capacity retaining ratio after 100th run (%) |
|---|---|---|---|
| Ex. 1 | Li(Mn$_{0.9}$Sn$_{0.1}$)(P$_{0.8}$Si$_{0.2}$)O$_4$ | 7.94 | 90.3 | 85.1 |
| Ex. 2 | Li(Mn$_{0.875}$Al$_{0.125}$)(P$_{0.875}$Si$_{0.125}$)O$_4$ | 7.85 | 95.2 | 85.5 |
| Ex. 3 | Li(Mn$_{0.95}$Zr$_{0.05}$)(P$_{0.9}$Si$_{0.1}$)O$_4$ | 7.80 | 88.5 | 85.8 |
| Com. Ex. 1 | Li(Fe$_{0.8}$Mn$_{0.2}$)PO$_4$ | 8.54 | 140.4 | 60.1 |
| Com. Ex. 2 | Li(Mn$_{0.95}$Sn$_{0.05}$)(P$_{0.9}$Si$_{0.1}$)O$_4$ | 8.50 | 90.5 | 78.8 |

It is noted from Table 1 that the capacity retaining ratio is excellent in a cathode active material where the volume changing ratio is less than 8%.

Further, in view of Example 1 and Comparative Example 2, suppressive effect for volume change ratio is insufficient and capacity retaining ratio is not favorable when the substituting amount of Si is too small.

The cathode active material of the present invention is not only excellent in view of safety and cost but also it can provide a battery of long lifetime. Therefore, it can be advantageously used as a cathode active material in a non-aqueous secondary battery such as a lithium ion battery.

Although the present invention can be illustrated as mentioned above, it can be obviously modified by many means as well. The modified examples as such are not departed from the gist and the coverage of the present invention and it is intended that all of the modified examples obvious to persons skilled in the art are covered within a scope of the claims.

Incidentally, this application is related to Japanese patent application No. 2010-151056 filed on Jul. 1, 2010 and disclosure of which is incorporated by reference in its entirety.

The invention claimed is:

1. A cathode active material having a composition represented by formula (I) below, $$LiMn_{1-x}M_xP_{1-y}Si_yO_4 \qquad (1)$$

wherein M is at least one kind of element selected from a group consisting of Zr, Sn, and Al; x is within a range of $0<x\leq0.5$; and y is within a range of $0<y\leq0.5$ and wherein the cathode active material has a volume change ratio of not more than 8% as a result of intercalation and deintercalation of Li.

2. The cathode active material according to claim 1, wherein x, y and M have such a relation that $x\times[(valence of M)-2]-0.05<y<x\times[(valence of M)-2]+0.05$.

3. The cathode active material according to claim 1, wherein M is any one kind of element selected from the group consisting of Zr and Al and x is within a range of $0.05\leq x\leq0.25$.

4. The cathode active material according to claim 1, wherein M is any one kind of element selected from the group consisting of Sn and Al and x is within a range of $0.1\leq x\leq0.25$.

5. A cathode comprising the cathode active material of claim 1, an electrical conductive material, and a binder.

6. A non-aqueous secondary battery comprising the cathode of claim 5, an anode, an electrolyte and a separator.

* * * * *